(12) United States Patent
Chiu

(10) Patent No.: US 7,545,576 B2
(45) Date of Patent: Jun. 9, 2009

(54) VARIABLE FOCAL LENGTH ASSEMBLY HAVING OPTICAL LENS MODULE

(75) Inventor: Wen-Ssu Chiu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 159 days.

(21) Appl. No.: 11/309,823

(22) Filed: Oct. 3, 2006

(65) Prior Publication Data
US 2007/0146896 A1    Jun. 28, 2007

(30) Foreign Application Priority Data
Dec. 23, 2005    (CN)    ............ 2005 1 0121213

(51) Int. Cl.
G02B 15/14    (2006.01)
G02B 3/08    (2006.01)
(52) U.S. Cl. .................... 359/676; 359/672; 359/741
(58) Field of Classification Search ......... 359/672–675, 359/741
See application file for complete search history.

(56) References Cited

U.S. PATENT DOCUMENTS

| | | | | |
|---|---|---|---|---|
| 5,153,778 A | * | 10/1992 | Sasian-Alvarado | 359/742 |
| 5,515,206 A | * | 5/1996 | Peng | 359/721 |
| 5,528,416 A | * | 6/1996 | Hartmann | 359/381 |
| 5,982,543 A | * | 11/1999 | Fiala | 359/565 |
| 6,052,223 A | | 4/2000 | Yoneyama et al. | |
| 6,278,558 B1 | * | 8/2001 | Chang | 359/676 |
| 6,572,935 B1 | * | 6/2003 | He et al. | 427/577 |
| 6,830,332 B2 | * | 12/2004 | Piers et al. | 351/159 |
| 6,947,220 B1 | * | 9/2005 | Soskind | 359/641 |
| 6,977,777 B1 | | 12/2005 | Wick | |
| 7,170,690 B2 | * | 1/2007 | Ophey | 359/676 |

* cited by examiner

*Primary Examiner*—Jordan M. Schwartz
(74) *Attorney, Agent, or Firm*—Frank R. Niranjan (57) ABSTRACT

A variable focal length lens assembly includes at least one lens group, and at least one optical lens module. The optical lens module includes multiple portions distributed in turn around a central axis of the optical lens module, wherein at least one of the multiple portions has a thickness different from its neighboring portions, and each portion of the optical lens module is selectively aligned in an optical path of the lens group.

10 Claims, 7 Drawing Sheets

VARIABLE FOCAL LENGTH ASSEMBLY HAVING OPTICAL LENS MODULE

TECHNICAL FIELD

The present invention relates to optical lens modules and, more particularly to an optical lens module which can be used in image pick-up devices and a variable focal length lens assembly having the optical lens module.

DISCUSSION OF RELATED ART

Zoom lens systems are optical imaging systems that have a variable magnification or focal length while keeping the image plane stationary. Generally, a zoom lens system includes multiple lens groups arranged with a distance between every two neighboring lens groups. Each of the lens groups usually includes several convex and/or concave lenses arranged in a certain sequence, and has a positive or negative focal power. An image pick-up device (such as camera) including the zoom lens usually uses cams or gears to drive the lens groups to move in a direction of an optical axis of the lens groups and adjust the distance between the neighboring lens groups, in order to change the focal length of the image pick-up device.

However, the moving of the lens groups to change the focal length typically takes up much space in the direction of the optical axis, and greatly restricts the miniaturization applications of the cameras having this zoom lens system.

Therefore, what is needed is a variable focal length lens assembly competent for miniaturization application.

SUMMARY

In one embodiment of the present invention, an optical lens module is provided. The optical lens module includes a transparent block that includes a plurality of lens portions each having a uniform but distinct thickness.

In another embodiment of the present invention, a variable focal length lens assembly is provided. The variable focal length lens assembly includes at least one lens and at least one optical lens module arranged adjacent to the at least one lens. The at least one optical lens module includes a transparent block that includes a plurality of lens portions each having a uniform but distinct thickness. The at least one optical lens can be moved in a manner such that one lens portion thereof is selectively coaxially aligned with the at least one lens group.

Detailed features of the present optical lens module will become more apparent from the following detailed description and claims, and the accompanying drawings.

BRIEF DESCRIPTION OF THE DRAWINGS

Many aspects of the present optical lens can be better understood with reference to the following drawings. The components in the drawings are not necessarily drawn to scale, the emphasis instead being placed upon clearly illustrating the principles of the present optical lens. Moreover, in the drawings, like reference numerals designate corresponding parts throughout the several views, wherein.

DETAILED DESCRIPTION OF PREFERRED EMBODIMENTS

Reference will now be made to the drawings to describe the preferred embodiments of the present optical lens device and the variable focal length assembly, in detail.

Figure 1:
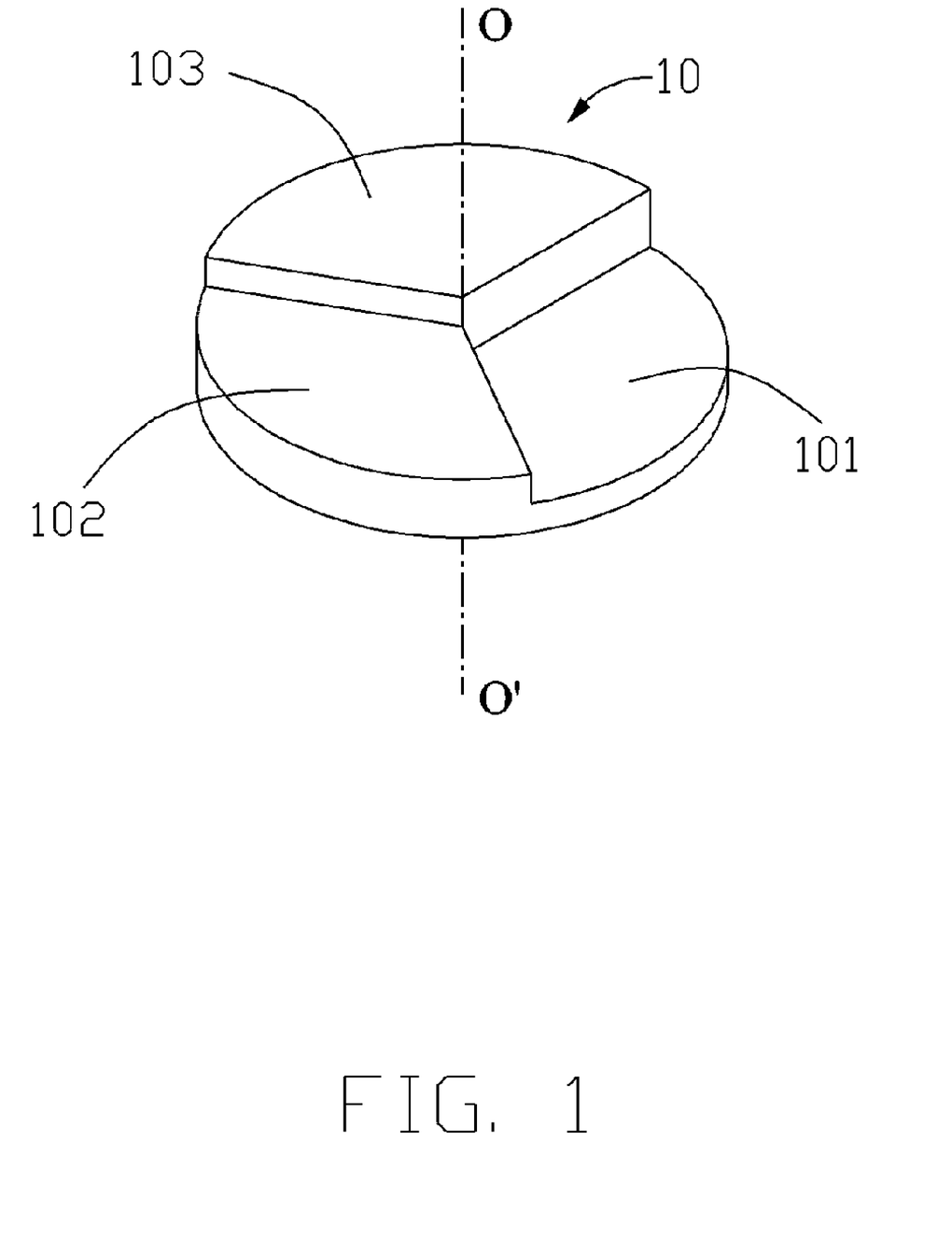
FIG. 1 is a schematic, isometric view of an optical lens module according to a first exemplary embodiment.

Referring now particularly to FIG. 1, an optical lens module 10 according to a first embodiment of the present invention is shown. The optical lens module 10 is a transparent circular plate. The optical lens module 10 can be made of a material selected from a group consisting of glass and optical plastic, such as polymethylmethacrylate, polystyrene, polycarbonate and so on.

The optical lens module 10 includes a first sector portion 101, a second sector portion 102 and a third sector portion 103. Each of the three portions 101, 102, 103 is a sector of a circular plate. The first portion 101 has a uniform thickness of d1, the second portion 102 has a uniform thickness of d2, and the third portion 103 has a uniform thickness of d3. d1, d2 and d3 are different from each other. The first portion 101, second portion 102 and third portion 103 are distributed one next to another around a central axis OO' of the optical lens module 10 in an ascending order of the thicknesses thereof.

Figure 2:
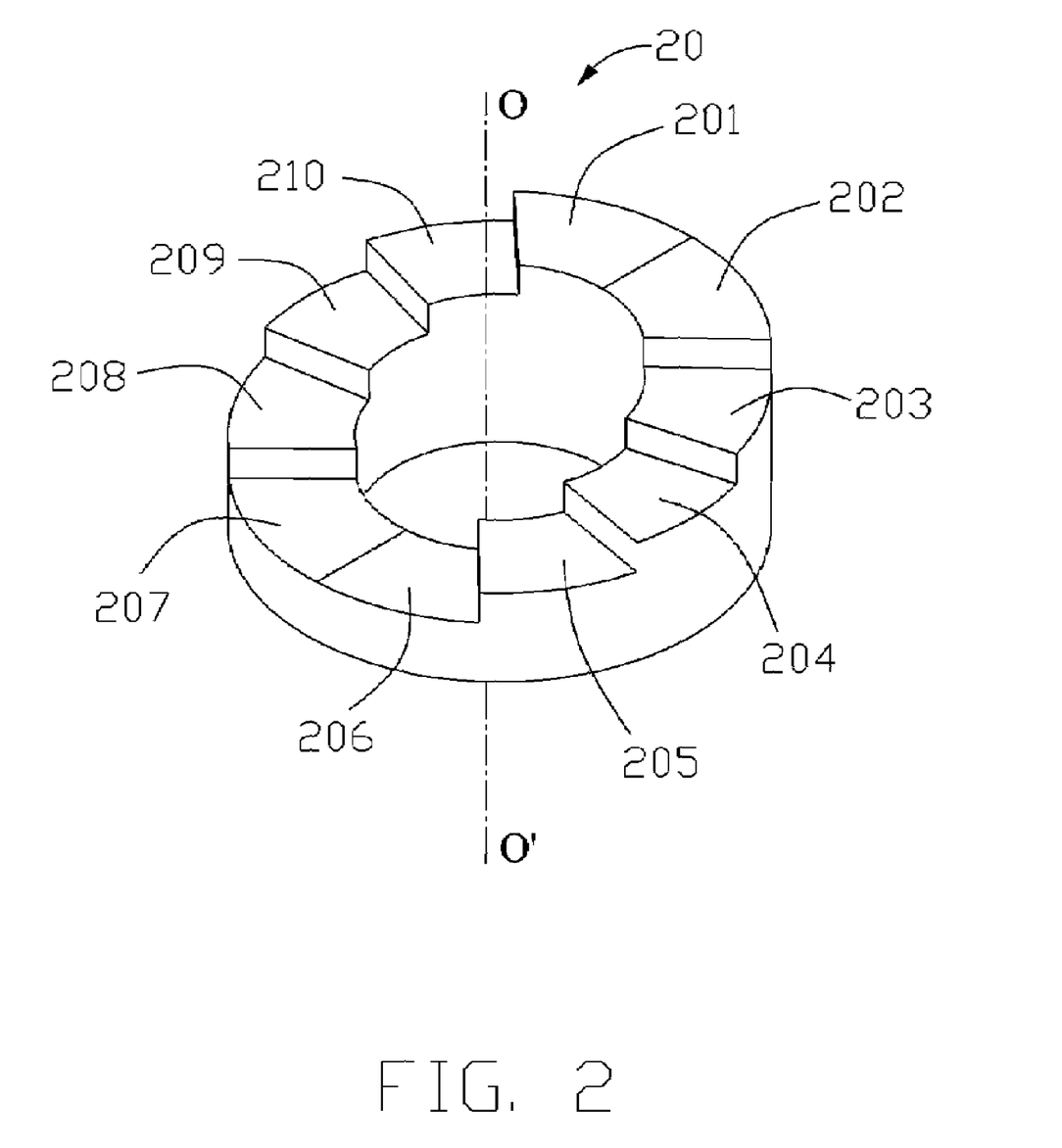
FIG. 2 is a schematic, isometric view of an optical lens module according to a second exemplary embodiment.

Referring now to FIG. 2, an optical lens module 20 according to a second embodiment of the present invention is shown. The optical lens module 20 is a transparent annular plate. The optical lens module 20 can be made of a material selected from a group consisting of glass and optical plastic, such as polymethylmethacrylate, polystyrene, polycarbonate and so on.

The optical lens module 20 includes: a first portion 201, a second portion 202, a third portion 203, a fourth portion 204, a fifth portion 205, a sixth portion 206, a seventh portion 207, an eighth portion 208, a ninth portion 209 and a tenth portion 210. Each of the portions 201~210 forms a truncated sector shape of an annulus. The first portion 201 and the second portion 202 each have a uniform thickness of d1. The third portion 203 and the tenth portion 210 each have a uniform thickness of d2. The fourth portion 204 and the ninth portion 209 each have a uniform thickness of d3. The fifth portion 205 and the eighth portion 208 each have a uniform thickness of d4. The sixth portion 206 and the seventh portion 207 each have a uniform thickness of d5. d1, d2, d3, d4, and d5 are different from each other. The second portion 202, the third portion 203, the fourth portion 204, the fifth portion 205, the sixth portion 206 are distributed one next to another around a central axis OO' of the optical lens module 20 in a descending order of the thicknesses thereof. The seventh portion 207, the eighth portion 208, the ninth portion 209, the tenth portion 210 and the first portion 201 are distributed one next to another around the central axis OO' of the optical lens module 20 in an ascending order of the thicknesses thereof.

Figure 3:
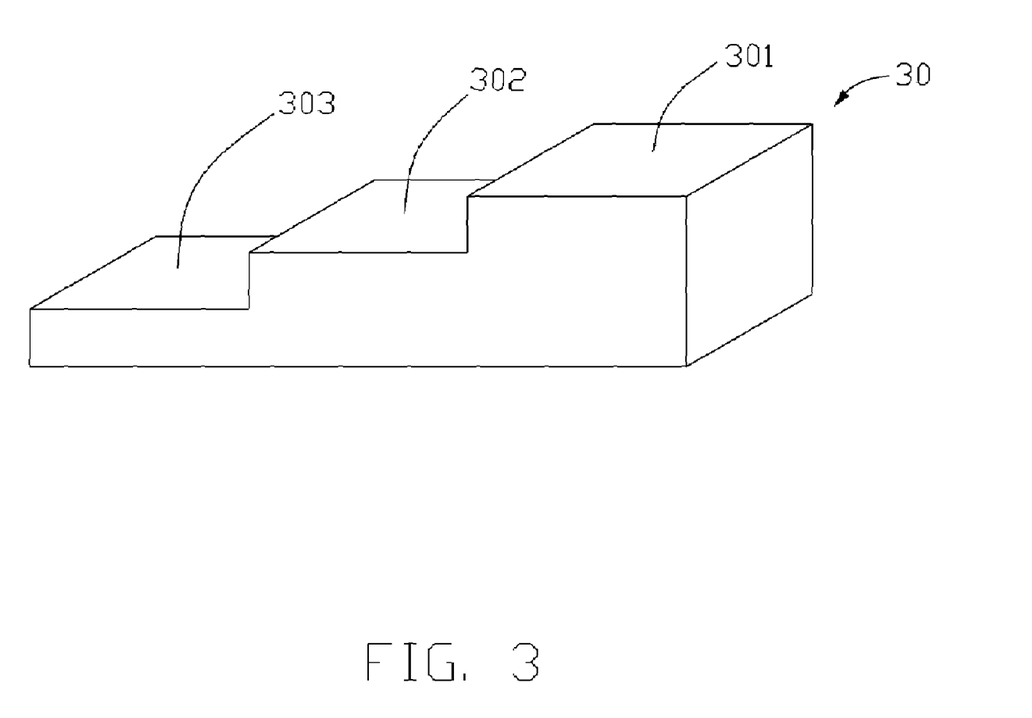
FIG. 3 is a schematic, isometric view of an optical lens module according to a third exemplary embodiment.
Figure 4:
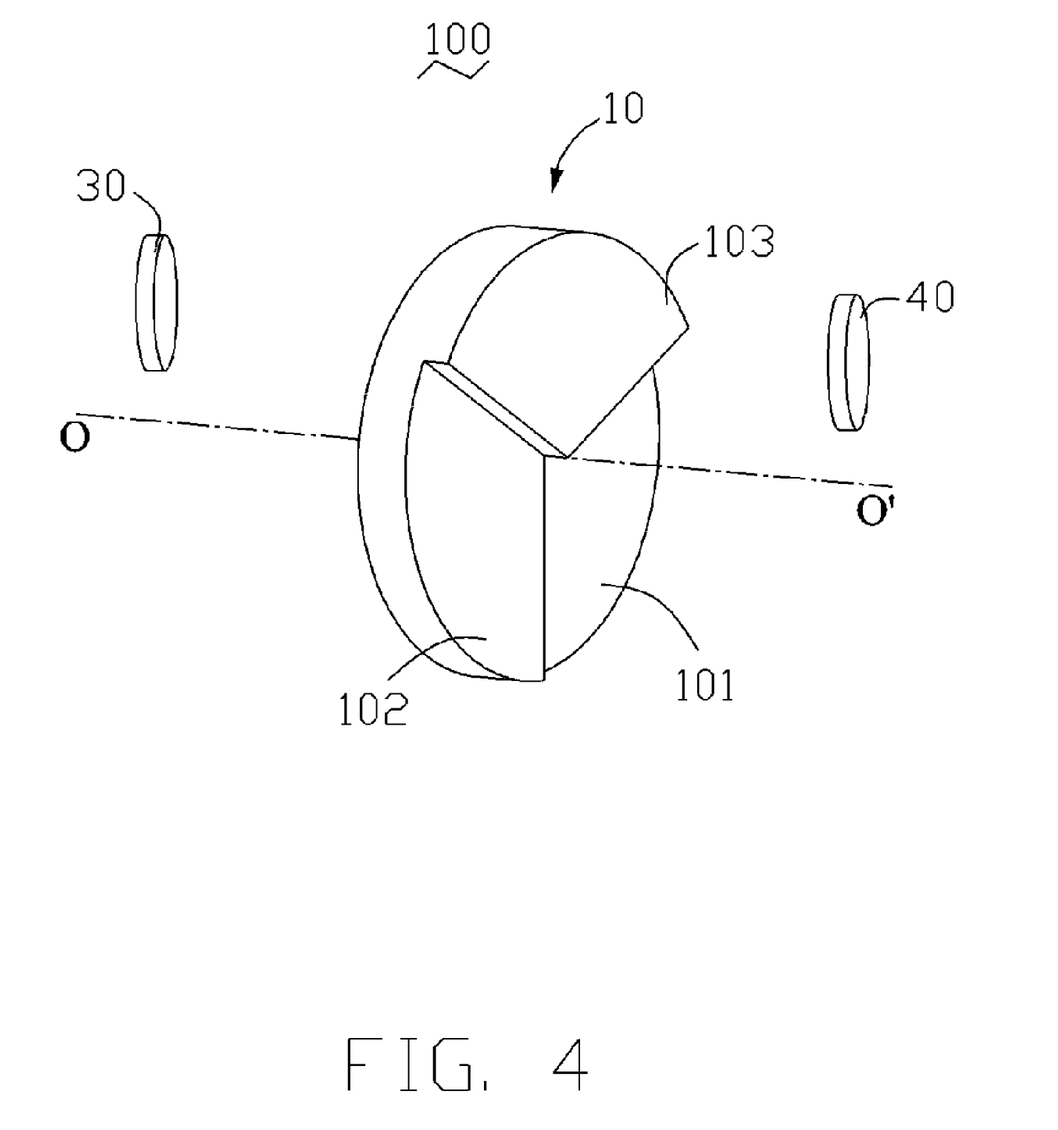
FIG. 4 is a schematic, isometric view of a variable focal length lens assembly being in a first active state according to a fourth exemplary embodiment.
Figure 5:
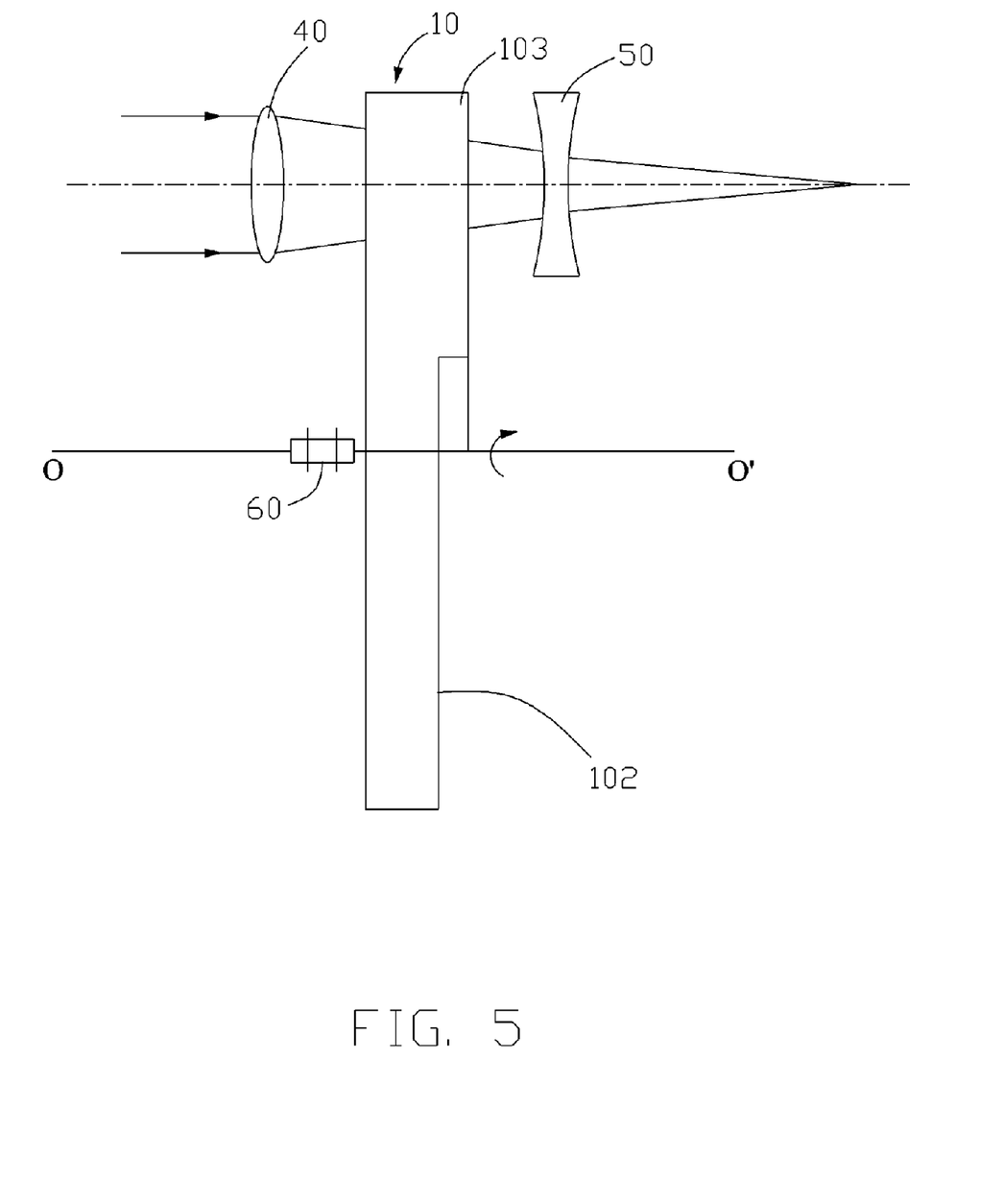
FIG. 5 is a side view of the variable focal length lens assembly being in the first active state according to the fourth exemplary embodiment.
Figure 6:
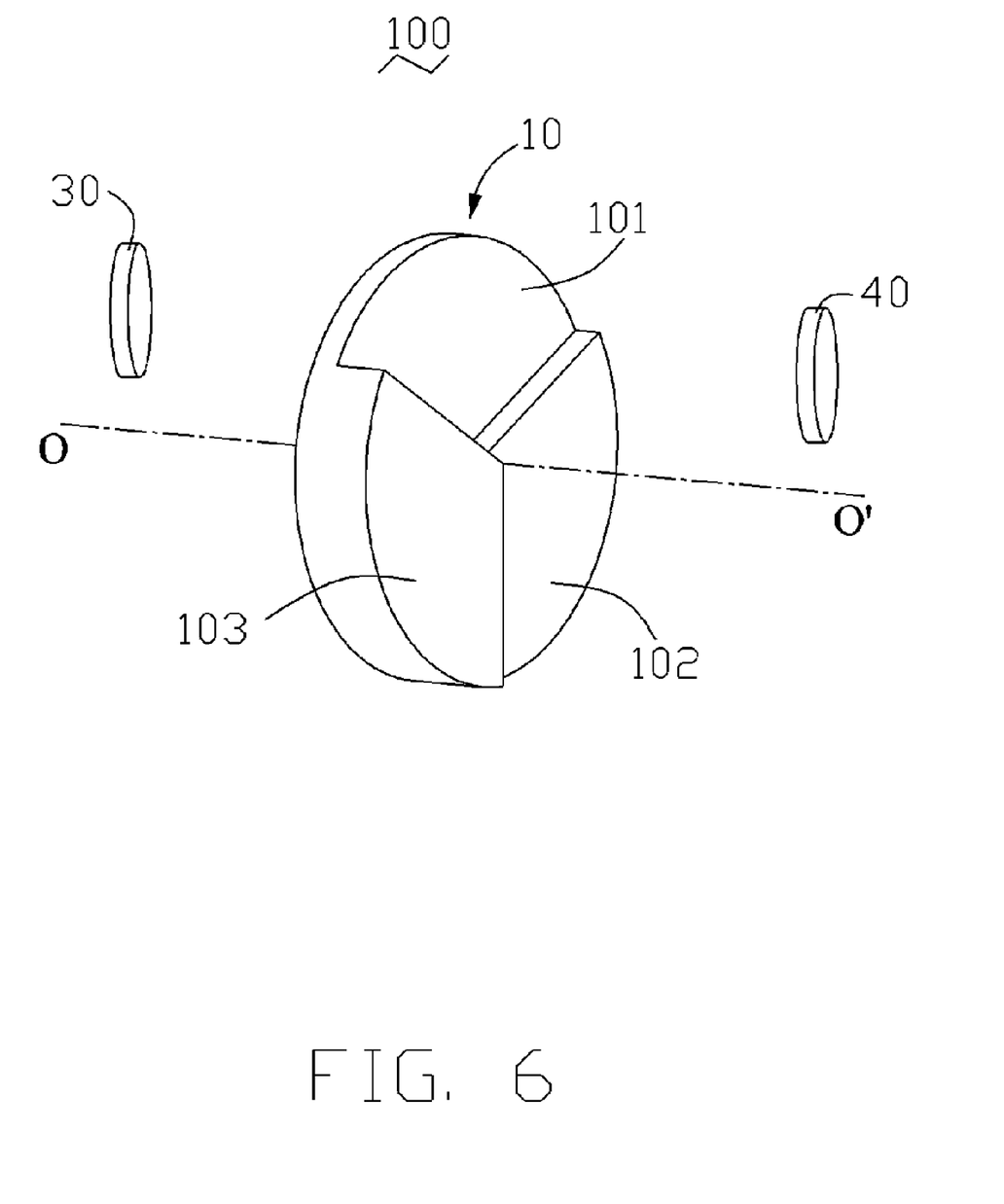
FIG. 6 is a schematic, isometric view of the variable focal length lens assembly being in a second active state according to the fourth exemplary embodiment.
Figure 7:
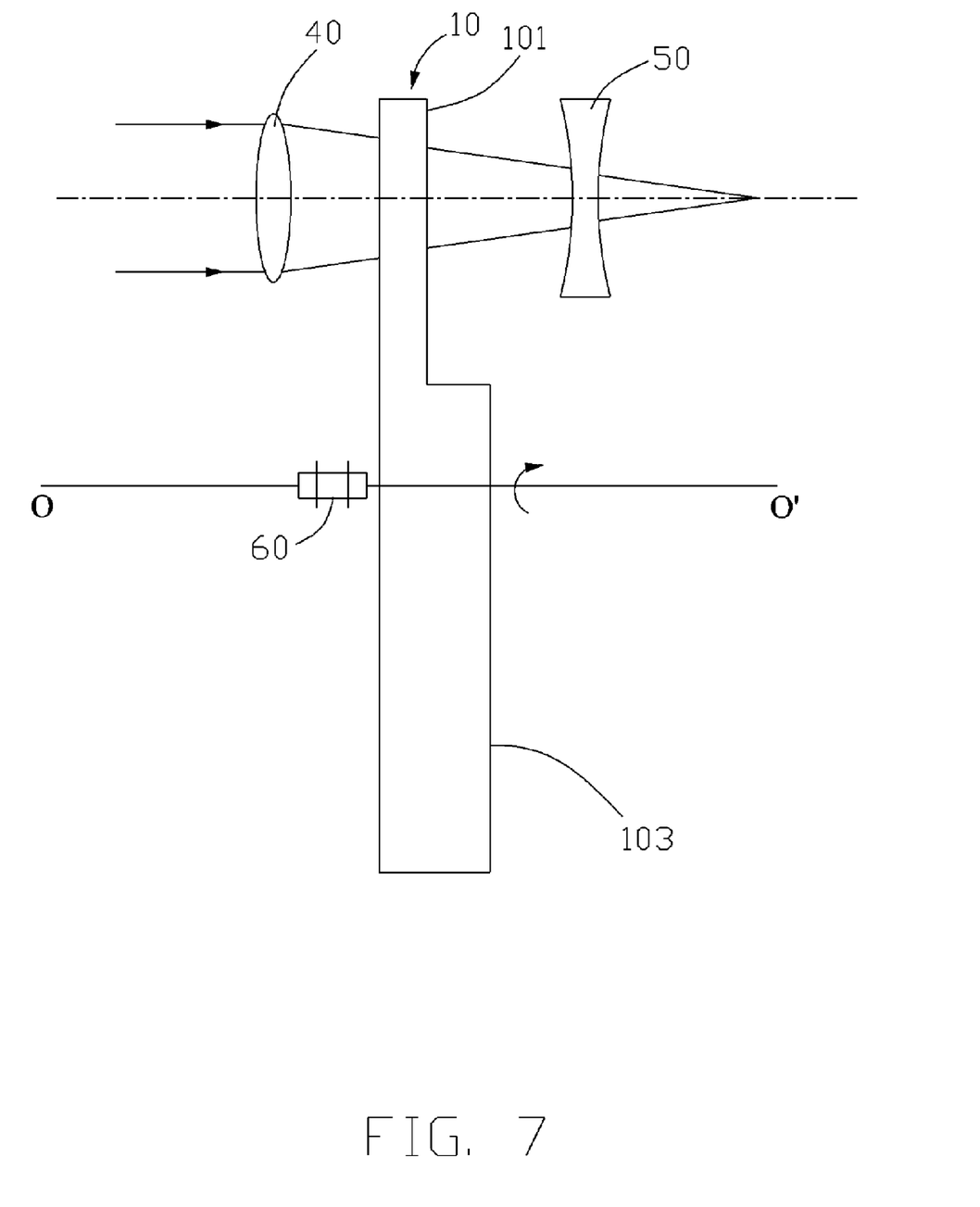
FIG. 7 is a side view of the variable focal length lens assembly being in a second active state according to the fourth exemplary embodiment.

Referring now to FIG. 3, an optical lens module 30 according to a third embodiment of the present invention is shown.

The optical lens module 30 is a transparent elongated plate. The optical lens module 30 can be made of a material selected from a group consisting of glass and optical plastic, such as polymethylmethacrylate, polystyrene, polycarbonate and so on.

The optical lens module 30 includes a first sector portion 301, a second sector portion 302 and a third sector portion 303. The first portion 301 has a uniform thickness of d1, the second portion 302 has a uniform thickness of d2, and the third portion 303 has a uniform thickness of d3. d1, d2 and d3 are different from each other. The first portion 301, the second portion 302 and the third portion 303 are distributed one next to another in a descending order of the thicknesses thereof.

Referring to FIGS. 4 to 7, a variable focal length lens assembly 100 according to a fourth embodiment of the present invention is shown. The variable focal length lens assembly 100 includes a first lens group 40, a second lens group 50 and at least one optical lens module 10.

The first lens group 40 has a positive focal power and the first lens group 40 is arranged at an objective side of the variable focal length lens assembly 100. The second lens group 50 has a negative focal power and the second lens group 50 is arranged at an image side of the variable focal length lens assembly 100. Thus the first lens group 40 and the second lens group 50 define an optical path.

The optical lens module 10 is arranged between the first lens group 40 and the second lens group 50. One portion of the optical lens module 10 is disposed in the optical path. Therefore, the incident light that propagates through the first lens group 40 can pass said portion of the optical lens module 10, and successively transmit through the second lens group 50.

According to other exemplary embodiments, the variable focal length lens assembly can have different configurations, such as:

(1) The variable focal length lens assembly includes a lens group arranged at an objective side, and at least one optical lens module arranged at an image side;

(2) The variable focal length lens assembly includes two or more lens groups arranged at an objective side, and at least one optical lens module arranged at an image side;

(3) The variable focal length lens assembly includes three lens groups, and at least one optical lens module arranged between any couple of neighboring lens groups;

(4) The variable focal length lens assembly includes three lens groups, at least one optical lens module arranged between any couple of neighboring lens groups, and at least one optical lens module arranged at an image side.

It is noted that, if the variable focal length lens assembly includes multiple optical lens modules, the multiple optical lens modules can have the same configuration or different configurations. For example, the variable focal length lens assembly may employ two identical optical lens modules 10 with the same size, configuration, amount of sector portions, and thickness for each corresponding sector portion; or two optical lens modules with different sizes, configurations, amounts of sector portions, and/or thickness for each sector portion.

Preferably, the variable focal length lens assembly 100 further includes a driving means 60, such as a motor configured (i.e., structured and arranged) for driving the optical lens module 10 to rotate around the central axis OO' of the optical lens module 10 so as to selectively coaxially align one portion of the optical lens module 10 in the optical path of the variable focal length lens assembly 100.

The active state of the variable focal length lens assembly 100 is described as follows:

(1). In a first active state (referring to FIG. 4 and FIG. 5), the third portion 103 of the optical path difference 10 is in the optical path between the first lens group 40 and the second lens group 50. An incident light successively passes through the first lens group 40, the third portion 103 and the second lens group 50, and finally converges at a focal point of the variable focal length lens assembly 100.

(2). In a second active state (referring to FIG. 6 and FIG. 7), the optical path lens 10 is driven to rotate around the axis OO' so that the first portion 101 is disposed in the optical path between the first lens group 40 and the second lens group 50. Because the thickness of the first portion 101 is different from the thickness of the third portion 103, the optical path length of the incident light passing through the variable focal length lens assembly 100 is different from that of the first active state. Therefore, a focal length of the variable focal length lens assembly 100 is changed accordingly.

Therefore, different portions (the first portion 101, the second portion 102 and the third portion 103) disposed in the optical path between the first lens group 40 and the second lens group 50 result in different optical path lengths. Accordingly, the variable focal length lens assembly 100 employing such optical lens devices has variable focal lengths. When the variable focal length lens assembly 100 includes multiple optical lens modules that have multiple portions, the number of the variable focal length is an arithmetic product of the variable focal lengths numbers of the multiple optical lens modules.

It is to be noted that, the optical lens module 10 of the variable focal length lens assembly 100 can also be replaced by the optical lens module 20 or 30. The optical lens module 20 can be driven by the driving means to rotate relative to an axis parallel to an optical axis associated with the lens group 40 and the optical lens module 30 can be driven by the driving means to move lengthwise such that one lens portion of the optical lens module 20 or 30 can be selectively coaxially aligned with the lens group 40.

The optical lens module provided in the exemplary embodiments has multiple portions with different thicknesses. The variable focal length lens assembly employing the optical lens module can zoom by selectively disposing a certain portion of the optical lens module in the optical path of the variable focal length assembly. Therefore, the variable focal length lens assembly zooms without adjusting the spacing between the lens groups, and the optical lens module is thus greatly advantageous for miniaturized application in a camera.

While this invention has been described as having a preferred design, the present invention can be further modified within the spirit and scope of this disclosure. This application is therefore intended to cover any variations, uses, or adaptations of the invention using its general principles. Furthermore, this application is intended to cover such departures from the present disclosure as come within known or customary practice in the art to which this invention pertains and which fall within the limits of the appended claims.

What is claimed is:

1. A variable focal length lens assembly, comprising:
    at least one lens group; and
    at least one optical lens module arranged adjacent to the at least one lens group, the at least one optical lens module defining a central axis and comprising a transparent block comprising a plurality of lens portions, the lens portions being distributed one next to another around the central axis, each lens portion having a uniform thickness as measured parallel to the central axis, the thickness of each lens portion being different from that of each other lens portion, two adjacent lens portions cooperatively forming a step, the at least one optical lens module being movable in a manner such that one lens portion thereof is selectively coaxially aligned with the at least one lens group.

2. The variable focal length lens assembly according to claim 1, further comprising a driving means configured for driving the optical lens module to move in the manner such that one lens portion thereof is selectively coaxially aligned with the at least one lens group.

3. The variable focal length lens assembly according to claim 2, wherein the driving means is a motor.

4. The variable focal length lens assembly according to claim 1, wherein the lens portions are arranged one next to another in descending or ascending order of the thicknesses thereof.

5. The variable focal length lens assembly according to claim 1, wherein the transparent block is circular or annular in shape.

6. The variable focal length lens assembly according to claim 1, wherein the at least one optical lens module is rotatable relative to an axis parallel to an optical axis associated with the at least one lens group such that one lens portion of the at least one optical lens module is selectively coaxially aligned with the at least one lens group.

7. The variable focal length lens assembly according to claim 1, wherein the at least one lens group is configured for receiving non-parallel light beams from a given side thereof or transmitting non-parallel light beams toward the given side, the at least one optical lens module being arranged at the given side adjacent to the at least one lens group.

8. A variable focal length lens assembly, comprising:
a lens group; and
an optical lens module with a central axis, the optical lens module being arranged adjacent to the lens group, the optical lens module comprising a transparent block having a first lens portion and a second lens portion, the first lens portion having a uniform thickness d1 as measured parallel to the central axis, the second lens portion having a uniform thickness d2 as measured parallel to the central axis, d1 being unequal to d2, wherein the first and second lens portions cooperatively form a step, and the optical lens module is movable in a manner such that one of the lens portions thereof is selectively coaxially aligned with the lens group.

9. The variable focal length lens assembly according to claim 8, wherein the transparent block defines a through hole at a center thereof.

10. The variable focal length lens assembly according to claim 1, wherein the transparent block defines a through hole at a center thereof.

* * * * *